United States Patent
Adkins

(10) Patent No.: US 9,986,728 B2
(45) Date of Patent: Jun. 5, 2018

(54) TERMITICIDE FLEX PLUG SYSTEM AND METHOD

(71) Applicant: Lary Adkins, Kennedale, TX (US)

(72) Inventor: Lary Adkins, Kennedale, TX (US)

( * ) Notice: Subject to any disclaimer, the term of this patent is extended or adjusted under 35 U.S.C. 154(b) by 275 days.

(21) Appl. No.: 14/925,483

(22) Filed: Oct. 28, 2015

(65) Prior Publication Data

US 2017/0118972 A1   May 4, 2017

(51) Int. Cl.
| | |
|---|---|
| *A01M 1/20* | (2006.01) |
| *E04B 1/72* | (2006.01) |
| *A01M 1/24* | (2006.01) |
| *B25B 27/28* | (2006.01) |
| *E04G 17/06* | (2006.01) |

(52) U.S. Cl.
CPC .............. *A01M 1/20* (2013.01); *A01M 1/24* (2013.01); *E04B 1/72* (2013.01); *A01M 2200/011* (2013.01); *B25B 27/28* (2013.01); *E04G 17/0644* (2013.01)

(58) Field of Classification Search
CPC ......... B25B 27/00; B25B 27/28; B25B 33/00; A01M 1/20; A01M 1/24; A01M 2200/011; E04B 1/72; E04G 17/0644; Y10T 29/53943
USPC ......................... 43/132.1; 81/44, 177.5, 180.1
See application file for complete search history.

(56) References Cited

U.S. PATENT DOCUMENTS

| | | | | |
|---|---|---|---|---|
| 2,944,334 | A * | 7/1960 | Arrighini | E04G 17/0644 29/235 |
| 4,016,696 | A * | 4/1977 | Mess | E04G 17/0644 29/278 |
| 4,785,692 | A * | 11/1988 | Holmes | B25B 27/02 81/27 |
| 4,807,415 | A * | 2/1989 | Oak | E04B 1/72 52/101 |
| 4,811,531 | A * | 3/1989 | Vallerand | E04B 1/72 52/127.5 |
| 6,226,948 | B1 * | 5/2001 | Trout | E04G 23/0203 173/90 |
| 2008/0314902 | A1 * | 12/2008 | Dayton | F16L 5/04 220/235 |
| 2011/0110743 | A1 * | 5/2011 | Heimer | F16B 13/0858 411/15 |

* cited by examiner

*Primary Examiner* — Robert Canfield
(74) *Attorney, Agent, or Firm* — Law Office of Jeff Williams; J. Oliver Williams

(57) ABSTRACT

The present application includes a system configured to simplify the application of plugs into holes created in concrete slabs during a termiticide treatment process. The system includes a flexible plug for insertion into the hole one or more times. A plug tip is coupled to a tool and selectively adjusted to a particular depth. A locating element is included to prevent the over protruding of the plug tip in the hole. The tool is used by the user to insert the plug tip into the hole wherein the depth is governed by the location of the locating element. The plug tips may be interchanged or adjusted in depth along with the locating element. Once the plug has been located properly, a patch is then applied to the remaining hole.

19 Claims, 2 Drawing Sheets

TERMITICIDE FLEX PLUG SYSTEM AND METHOD

BACKGROUND

1. Field of the Invention

The present application relates generally to a termiticide treatment process, more particularly, to a system and method for using termiticide.

2. Description of Related Art

Termites are a common problem facing a large number of residential and commercial structures. Termites feed on dead plants (i.e. wood) among other things. There are three ecological groups of termites, namely drywood termites living in hardwood forests, dampwood termites living in coniferous forests, and subterranean termites living in diverse areas underground. Subterranean termites build tunnels to look for food and travel typically below ground.

Various treatments are available to prevent or kill termites. In particular with subterranean termites, ground treatments are necessary. For homes, treatments are done in the walls and around the foundation via the application of termiticide in trenches. Additional treatments are commonly done beneath the slab or cement foundation. This includes the drilling of a hole into the foundation at spaced intervals, the injection of termiticide into the hole, and the filling of the hole in a concrete patch.

It is desirable to separate the moisture from the termiticide from the cement patch used to cover the hole, so as to allow for proper setting of the concrete. Typically a paper product is wadded up and stuck in the holes. These are less effective because the paper absorbs the moisture and wicks it up to the concrete or pulls the moisture out of the concrete, each affecting the setting of the concrete negatively. In some cases rubberized plugs have been used. These are hardened and work to prevent the absorption of moisture but are extremely difficult to set in the hole. Additionally they are rather expensive. Another disadvantage of the hardened plastic plugs are that they are not removable from the holes. In order to remove them, they must be drilled out.

It is desirable to have a plug for the holes that prevents absorption and is easy to set in the hole to a selected depth to give room for the cement patch. Additionally it is recognized that a number of holes are to be drilled in concrete around the exterior of a structure and are subject to rain and moisture. It is undesirable to leave the open holes exposed over time before and after injection of the termiticide. Therefore it is advantageous to have a plug that is removable to allow the holes to be drilled, plugged for a period of time, and then removed when the termiticide is ready to be injected.

Another disadvantage of present methods for treating with termiticide is the method of setting the "plugs" to a proper depth in the hole. The depth can depend on a number of factors. Currently, pencils are used to push down the plug. It is very difficult to use a pencil with holes of different diameters and also measure the appropriate depth of the plug. The setting of plugs takes a considerable amount of time and results in large man-hour costs.

It is desirable to have a better tool that can fit holes of various diameters and easily sets a particular depth for each plug. It is ideal if such tool allowed for the adjustment of the depth setting as well. This would decrease man-hour costs and labor tremendously and help to ensure a more predictable quality.

Although some strides have been made in treating for subterranean termites, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
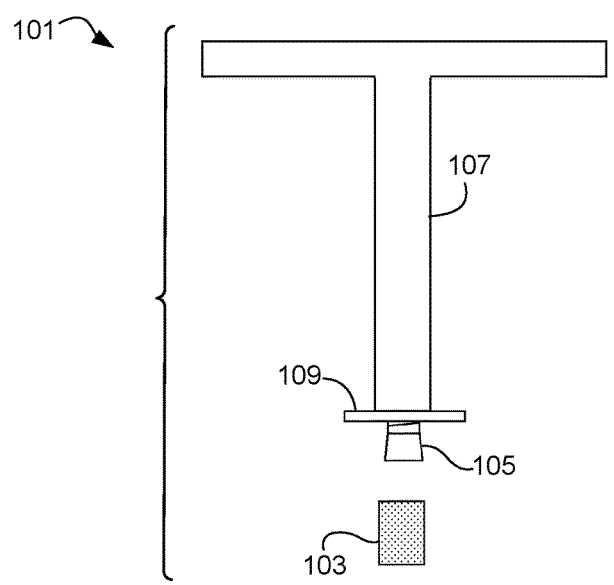
FIG. 1 is a side view of a termiticide flex plug system according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system in accordance with the present application overcomes one or more of the above-discussed problems commonly associated with conventional termiticide treatment methods. Specifically, the system of the present application is configured to selectively seal and locate a plug in a hole of the concrete slab after the insertion of termiticide beneath the slab. The plug may be inserted prior to or after injection of the termiticide through the hole. Moisture is not permitted to transfer through or around the plug in the hole. The plug forms to the contour of the hole to create a seal. A tool is used to quickly permit the setting of the plugs to a proper depth. The tool allows for the presetting of depth. These and other unique features of the system are discussed below and illustrated in the accompanying drawings.

The system and method will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The termiticide flex plug system of the present application is illustrated in the associated drawings. The system includes a plug configured to translate within the hole in the concrete slab to a predetermined location. A tool is operated by a user to push the plug into the hole. A plug tip is coupled to a lower portion of the tool and configured to extend into the hole. A locating element is coupled to at least one of the tool and the plug tip and is used to set a depth in which the plug tip will extend into the hole. The method includes selecting and coordinating the sizing of the plug and the plug tip. The locating element is set and the plug tip is secured relative to the tool. The user walks by each hole and inserts the plug tip into the hole to push the plug a predetermined distance into the hole as designated by the locating element.

Referring now to the drawings wherein like reference characters identify corresponding or similar elements in form and function throughout the several views. FIG. 1 in the drawings illustrates a side view of a termiticide flex plug system 101 according to the preferred embodiment of the present application. System 101 includes a plug 103, a plug tip, 105, a tool 107, and a locating element 109 all configured to simplify the insertion and sealing of holes formed in concrete slabs formed during termiticide treatments. It is understood that this system and the following method may be used independently outside termiticide treatments.

Figure 2:
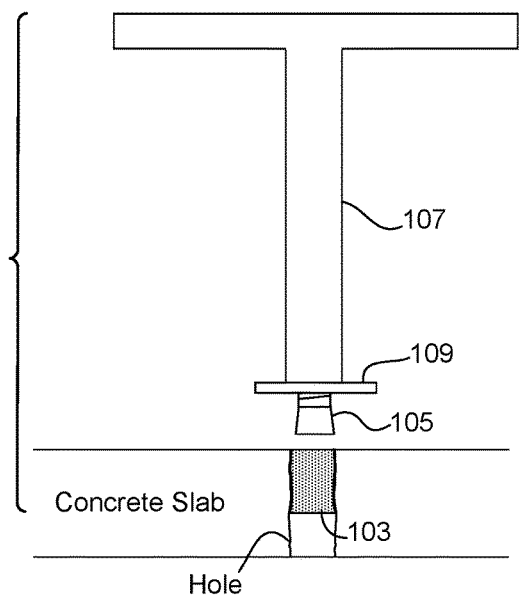
FIG. 2 is a side view of a tool and a plug in the termiticide flex plug system of FIG. 1 wherein the plug is preset in a hole of a concrete slab.
Figure 3:
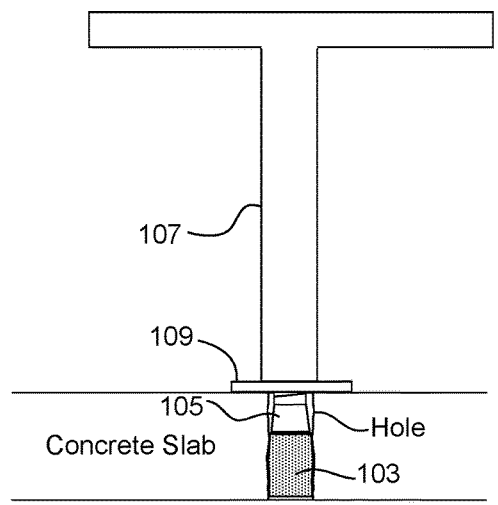
FIG. 3 is a side view of the tool and plug of FIG. 2 with the tool locating the plug to a preselected depth.

Referring now also to FIGS. 2 and 3 in the drawings, the operation of system 101 is illustrated. Plug 103 is a reusable item in system 101 and is configured to be sacrificed in the hole. Plug 103 is located into the hole adjacent the surface of the concrete slab. When the moment requires, tool 107 is used to align plug tip 105 with plug 103 and press plug 103 further into the hole. Locating element 109 is shown as restricting the travel of plug tip 105 into the hole and setting it at a desired depth. Once set, the hole may be patched and filled. Prior to filling/patching of the hole, plug 103 may be removed from the hole as needed.

Figure 6:
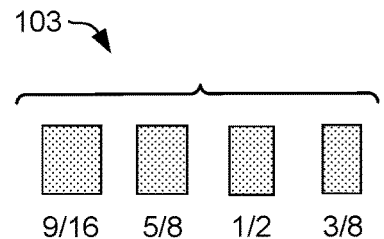
FIG. 6 is a side view of a plurality of plugs, as seen in FIGS. 2 and 3, each of a different diameter.

Referring now also to FIGS. 4-7 in the drawings, the various components and members of system 101 is illustrated. Plug 103 is configured to seal the hole to prevent the passage of liquid below the concrete slab. Plug 103 conforms to the contours of the hole and forms a seal along the interior surface of the hole. Plug 103 is made from one or more materials and is configured to prevent the passage of liquid and moisture through the hole. A preferred material for plug 103 is a closed cell foam. The closed cell nature of plug 103 prevents absorption liquid and moisture. As seen in FIG. 6, plug 103 may come in a variety of sizes. Sizes are shown below each plug tip in a measurement of inches. The size of plug 103 is selectively chosen based on the size of the hole. The sizes of available plugs are shown. It is understood that the plug sizes may be different from those depicted.

It is preferred that the plug is slightly larger than the hole diameter to allow the plug to compress and conform to the interior surfaces of the hole, thereby creating the seal. The compressive nature of plug 103 also allows it to be removed and reinserted into the hole. In way of example, plug 103 may be used to temporarily seal the hole prior to the insertion to termiticide. This could prevent the introduction of rain or other moisture into the holes and affect treatment conditions. Plug 103 may then be removed to allow for the injection of termiticide and reinserted, all without the need to drill it out of the hole.

Figure 7:
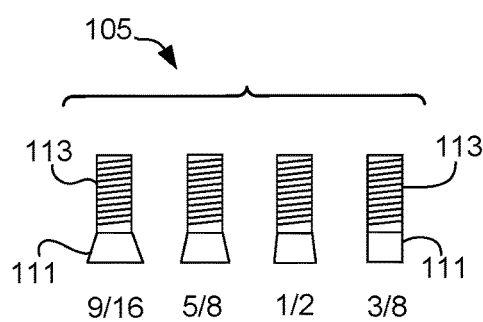
FIG. 7 is a side view of a plurality of plug tips, as seen used in FIGS. 2 and 3, each having a different tip diameter.

Referring in particular to FIG. 7, various sized plug tips 105 are illustrated. Each illustrated plug tip 105 illustrated is of a different size. Sizes are shown below each plug tip in a measurement of inches. The size of plug tip 105 is selectively chosen based on the size of plug 103 and the hole. It is understood that the sizes of plug tip 105 may be different from those depicted.

Plug tip 105 includes a flared end 111 and a central shaft 113. End 111 is configured to flare out from shaft 113 to a particular size dimension. End 111 is configured to match the relative sizing of plug 103, however, end 111 is sized slightly smaller than the internal diameter of the hole to permit plug tip 105 to translate through the hole. Shaft 113 is configured to couple to tool 107. One method of coupling is to use a threaded connection wherein tool 107 includes a female threaded end and shaft 113 is a male threaded end (see FIG. 4). Other methods of attachment are contemplated. For example, plug tip 105 may couple to tool 107 internally or externally. Additionally, threads may be used or ball springs and detents similar to those of sockets may also be used. It is important to note that plug tip 105 is detachable from tool 107 and may selectively be located in position relative to tool 107.

Locating element 109 is in communication with plug tip 105 and configured to locate the depth of the plug in the hole. Element 109 is designed to have a diameter larger than the hole, such that when tool 107 is used to push plug 103 in the hole, locating element contacts a portion of the concrete slab and prevents the over protruding of plug tip 105.

Figure 4:
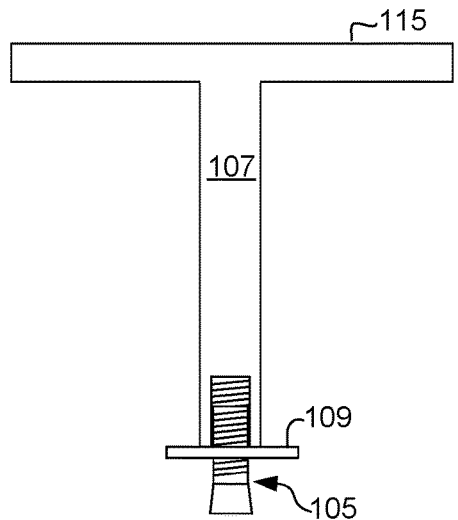
FIG. 4 is a side section view of the tool of FIGS. 2 and 3.
Figure 5:
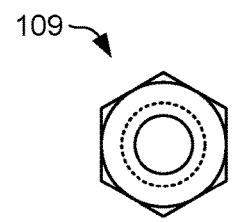
FIG. 5 is a side view of a locating element used on the tool of FIGS. 2 and 3.

Many different methods exist to attach and operate locating element 109. The depth of plug 103 in the hole is a measurement from the end of flared end 111 to a bottom surface of locating element 109. To allow for the precise measurement of that depth measurement, one method of adjustment is to use a threaded connection. As seen in FIG. 4, element 109 is in threaded connection with plug tip 105. Locating element 109 may be set on shaft 113 to an appropriate depth measurement and then tip 105 be threaded into tool 107. The contacting of element 109 creates a binding force that secures tip 105. In the preferred embodiment, element 109 is a combination of one or more washers having either right and/or left hand threads. It is understood that other element 109 may be configured to couple directly to tool 107 as opposed to tip 105. In this embodiment, tool 107 may have external threads.

Tool 107 is configured to provide an operator a handle 115 portion to grasp for operation and a lower portion for carrying tip 105. Multiple shapes and sizes of tool 107 may be used. In the preferred embodiment, the internal threaded portion for tip 105 is sized to correlate with the smallest flared end 111 size used, so as to avoid issues where the shaft 113 creates a shoulder and restricts insertion through the hole.

Figure 8:
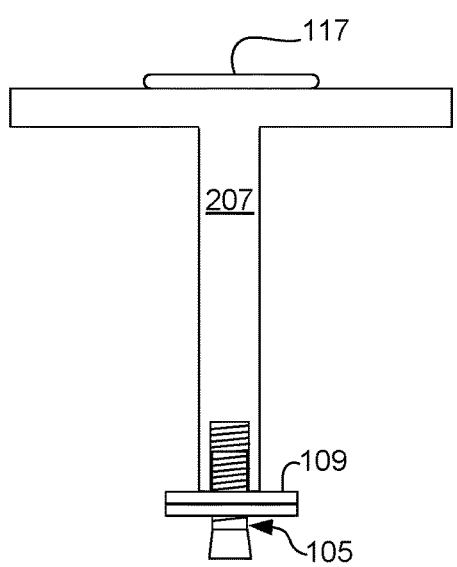
FIG. 8 is a side section view of an alternative embodiment of the tool of FIGS. 2 and 3 for use in the termiticide flex plug system of FIG. 1.

Referring now also to FIG. 8 in the drawings, an alternative embodiment of system 101 is illustrated. Tool 207 is similar in form and function to that of tool 107 except that it includes a strike plate 117 for the operator to apply pressure and force. Tool 207 may be used in place of tool 107 in system 101.

As stated previously, in operation a user selects the size of the plug and plug tip that will be used. The plug(s) will be located in the holes initially. Once the proper depth has been determined, the user will set the locating element 109 to the proper position and then secure the plug tip 105 to tool 107. If element 109 coupled directly to tool 107, then element 109 would be set and tip 105 would be secured to either a set predetermined station or to one of many optional stations. Once the tool, plug tip, and locating element are ready, the user walks along to each hole and merely protrudes the plug tip into the hole until the locating element contacts a portion of the concrete slab. If the hole sizes change, the plug tip may be interchanged. Furthermore, if the depth measurement changes, the locating element may be adjusted to a second station.

The current application has many advantages over the prior art including at least the following: (1) increased speed of setting the plugs; (2) proper seal to prevent passage of moisture through the hole; (3) reusable plugs; (4) infinite depth setting distances; (5) a locating element that is set for multiple uses; and 6) adjustable and interchangeable plug tips.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A termiticide flex plug system for use in the application of termiticide below a concrete slab, comprising:
    a plug configured to translate within a hole in the concrete slab to a predetermined location;
    a tool configured to selectively push the plug into the hole;
    a plug tip releasably coupled to an end of the tool and configured to pass into the hole and locate the plug, the plug tip having a shaft to pass internally within the tool; and
    a locating element in communication with the plug tip and the tool, the locating element translates along the shaft and creates a binding force upon the tool and the plug tip when the plug tip is inserted into the tool; the locating element configured to set the depth of penetration for the plug tip into the hole, the locating element is configured so as to prevent penetration of the tool into the hole;
    wherein adjustment of the locating element on the shaft provides depth adjustment of the plug tip in the hole.

2. The termiticide flex plug system of claim 1, wherein the plug is configured to seal the hole to prevent the passage of liquid below the concrete slab.

3. The termiticide flex plug system of claim 1, wherein the plug is made from a closed cell foam.

4. The termiticide flex plug system of claim 1, wherein the depth of the plug in the hole is dependent upon the size of the hole.

5. The termiticide flex plug system of claim 1, wherein the plug tip includes a flared end configured to contact the plug, the flared end passing into the hole.

6. The termiticide flex plug system of claim 1, wherein the plug tip is interchangeable with the tool to correlate with the size of the plug.

7. The termiticide flex plug system of claim 1, wherein the locating element is configured to have an outer diameter larger than the hole.

8. The termiticide flex plug system of claim 1, wherein the locating element includes one or more washers configured to rotate around the shaft of the plug tip.

9. The termiticide flex plug system of claim 1, wherein the tool includes a striker plate.

10. A method of filling a hole in a concrete slab, comprising:
    selecting a plug based on the size of the hole;
    obtaining a plug tip, the plug tip having a shaft and a flared end;
    attaching the plug to an end of a tool;
    pressing the plug into the hole;
    setting a locating element relative to the plug tip by translating the locating element along the shaft, the distance from the flared end to the locating element determining the depth of penetration of the plug tip into the hole;
    setting the plug tip in the tool; and
    locating the plug in the hole by passing the plug tip into the hole until the locating element contacts a portion of the concrete slab, the locating element preventing insertion of the tool into the hole.

11. The method of claim 10, further comprising:
    selecting the plug tip based on the size of plug.

12. The method of claim 10, wherein the plug tip is interchangeable with the tool to correlate with the size of the plug.

13. The method of claim 10, further comprising:
    interchanging the plug tip with the tool.

14. The method of claim 10, further comprising:
    adjusting the location of the locating element relative to a flared end of the plug tip, so as to adjust the depth of penetration within the hole.

15. The method of claim 10, wherein the plug is configured to seal the hole to prevent the passage of liquid below the concrete slab.

16. The method of claim 10, wherein the plug is made from a closed cell foam.

17. The method of claim 10, wherein the plug is inserted into the hole prior to the injection of termiticide into the hole.

18. The method of claim 10, wherein the plug is removable from the plug and configured to be located in the hole multiple times.

19. The method of claim 10, wherein the locating element is configured to have an outer diameter larger than the hole.

* * * * *